US007963833B2

(12) United States Patent
Novak et al.

(10) Patent No.: US 7,963,833 B2
(45) Date of Patent: Jun. 21, 2011

(54) GAMES WITH TARGETING FEATURES

(75) Inventors: Christopher M. Novak, Issaquah, WA (US); Alistair J. Baxter, Dundee (GB); Billy Thompson, Angus (GB); David Jones, Fife (GB); Peter Wong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1339 days.

(21) Appl. No.: 10/966,824

(22) Filed: Oct. 15, 2004

(65) Prior Publication Data

US 2006/0084509 A1 Apr. 20, 2006

(51) Int. Cl.
*A63F 9/24* (2006.01)
(52) U.S. Cl. ............................................... 463/2; 463/50
(58) Field of Classification Search .................. 463/1, 2, 463/9, 49–56
See application file for complete search history.

(56) References Cited

U.S. PATENT DOCUMENTS

| | | | | |
|---|---|---|---|---|
| 5,159,149 | A * | 10/1992 | Marsden ........................ | 102/217 |
| 5,865,832 | A * | 2/1999 | Knopp et al. .................... | 606/10 |
| 6,110,215 | A | 8/2000 | Stone | |
| 6,179,618 | B1 | 1/2001 | Stone | |
| 6,195,626 | B1 | 2/2001 | Stone | |
| 6,199,030 | B1 | 3/2001 | Stone | |
| 6,443,733 | B1 | 9/2002 | Stone | |
| 6,602,139 | B2 * | 8/2003 | Yamaguchi ..................... | 463/30 |
| 6,650,329 | B1 * | 11/2003 | Koike ........................... | 345/473 |
| 6,763,325 | B1 | 7/2004 | Stone | |
| 2001/0003708 | A1 * | 6/2001 | Aizu et al. ....................... | 463/7 |
| 2001/0029203 | A1 * | 10/2001 | Shoji et al. ...................... | 463/33 |
| 2002/0140696 | A1 * | 10/2002 | Futamura et al. ............. | 345/419 |
| 2004/0166914 | A1 * | 8/2004 | Ishihata et al. ................... | 463/2 |

OTHER PUBLICATIONS

Golden Eye Game Manual—www.replacementdocs.com.*
Golden Eye 007 Game Manual—www.replacementdocs.com.*
Splinter Cell Pandora Tomorrow Game Manual—www.replacementdocs.com.*
Splinter Cell Game review—www.gamedaily.com.*

* cited by examiner

*Primary Examiner* — David L Lewis
*Assistant Examiner* — Eric M Thomas
(74) *Attorney, Agent, or Firm* — Perkins Coie LLP

(57) ABSTRACT

The present invention is directed generally toward computer-implemented methods for targeting objects in a gaming system. One aspect of the invention is directed toward a method for targeting an object in a gaming system that includes receiving a soft lock command and applying a soft lock to an object in the game. The soft lock designates an action site on a portion of the object that was proximate to an aiming reference when the soft lock was commanded. The action site is proximate to a location where a selected game action will occur if the game action is commanded. Once the soft lock is applied, the aiming reference can be moved away from the action site.

Another aspect of the invention is directed toward a method of targeting an object in a gaming system that includes receiving a command to hard lock a portion of an object, applying the hard lock, and displaying at least one selectable sub-target associated with the object. During the hard lock, the aiming reference remains at least proximate to the portion of the object. When selected, a sub-target includes an action site on part of the object proximate to a location where game action will occur if selected.

39 Claims, 10 Drawing Sheets

GAMES WITH TARGETING FEATURES

TECHNICAL FIELD

The following disclosure relates generally to computer-based games and, more particularly, to computer-based games with targeting features.

BACKGROUND

Many computer games require a player to multi-task and manage high workload levels. For example, many computer games require a player to target and fire at objects in the game while maintaining situational awareness, avoiding hazards (e.g., being shot by other characters), and performing other tasks (e.g., moving through the game environment). It can be difficult to accomplish these simultaneous tasks during game play.

A player is often required to perform these multiple tasks using an aiming reticule that has several diverse functions. For example, in addition to aiming the player's weapon, movement of the reticule can be tied to the player's movement in the game and/or the movement of the player's field of view (e.g., where the player is looking in the game environment). The reticule can also be used to command a display of various attributes (e.g., health or strength) of an enemy combatant (e.g., a health bar can be displayed when the reticule is positioned over the combatant). Although using the reticule for multiple functions can simplify game play in many instances, it can increase workload in other areas. For example, when the player's movement and field of view are tied to the position of the reticule, it can be difficult to scan the game environment, move through the game, dodge hazards, and to target objects effectively.

In addition to high workload levels, the size of the object and/or the way the object moves can make precise targeting even more difficult. For example, a player may be able to place the reticule on an object, but have difficulty in tracking the object and/or being able to precisely target a specific portion of the target.

Accordingly, the player can be prevented from being able to effectively fire at a specific portion of the object during game play. Additionally, players that have little experience with a specific game may not even know which portions of the object are vulnerable to weapons fire.

Although it is desirable to make a computer game challenging, it is important that the level of difficulty be controlled so players enjoy the gaming experience. For example, complex games are often interesting and exciting, but can be difficult to play. In order to make these complex games enjoyable, the level of difficulty needs to be controlled.

SUMMARY

The present invention is directed generally toward computer-implemented methods for targeting objects in a gaming system. One aspect of the invention is directed toward a method for targeting an object in a gaming system that includes receiving a soft lock command and applying a soft lock to an object in the game. The soft lock designates an action site on a portion of the object that was proximate to an aiming reference when the soft lock was commanded. The action site is proximate to a location where a selected game action will occur if the game action is commanded. Once the soft lock is applied, the aiming reference can be moved away from the action site while the action site remains on the designated portion of the object. This can allow a player to move a character and/or look away from the object, while the action site remains on the designated portion of the object. This can allow a player to apply the game action to the portion of the object without having to reacquire an aiming solution. In some aspects of the invention a soft lock can be maintained even when the object is outside of the player's field of view.

Another aspect of the invention is directed toward a method of targeting an object in a gaming system that includes receiving a command to hard lock a designated portion of an object, applying the hard lock, and displaying at least one selectable sub-target associated with the object. When the hard lock is applied, the hard lock causes the aiming reference to remain at least proximate to the designated portion of the object. During the hard lock, if a selected game action is commanded, the game action will occur at least proximate to the aiming reference. Once the object is hard locked, the player can select one of the displayed sub-targets. Once selected, if a selected game action is commanded, the game action will occur proximate to the selected sub-target. In certain aspects of the invention, after applying a hard lock to an object, the player can select a sub-target and then change the selection by selecting a different sub-target.

DETAILED DESCRIPTION

The following disclosure describes several embodiments of systems and methods for games with targeting features. Specific details of several embodiments of the invention are described below to provide a thorough understanding of such embodiments. However, other details describing well-known structures and routines often associated with computer-based games are not set forth below to avoid unnecessarily obscuring the description of the various embodiments. Further, those of ordinary skill in the art will understand that the invention may have other embodiments that include additional elements or lack one or more of the elements described below with reference to FIGS. 1-12.

Certain embodiments of targeting features are described below in the context of computer-executable instructions performed by a game console or a general-purpose computer, such as a personal computer. In one embodiment, for example, these computer-executable instructions can be stored on a computer-readable medium, such as a hard disk, a floppy disk, or a CD-ROM. In other embodiments, these instructions can be stored on a server computer system and accessed via a computer network such as an intranet or the Internet. Because the basic structures and functions related to computer-executable routines and corresponding computer implementation systems are well known, they have not been shown or described in detail here to avoid unnecessarily obscuring the described embodiments.

Figure 1:
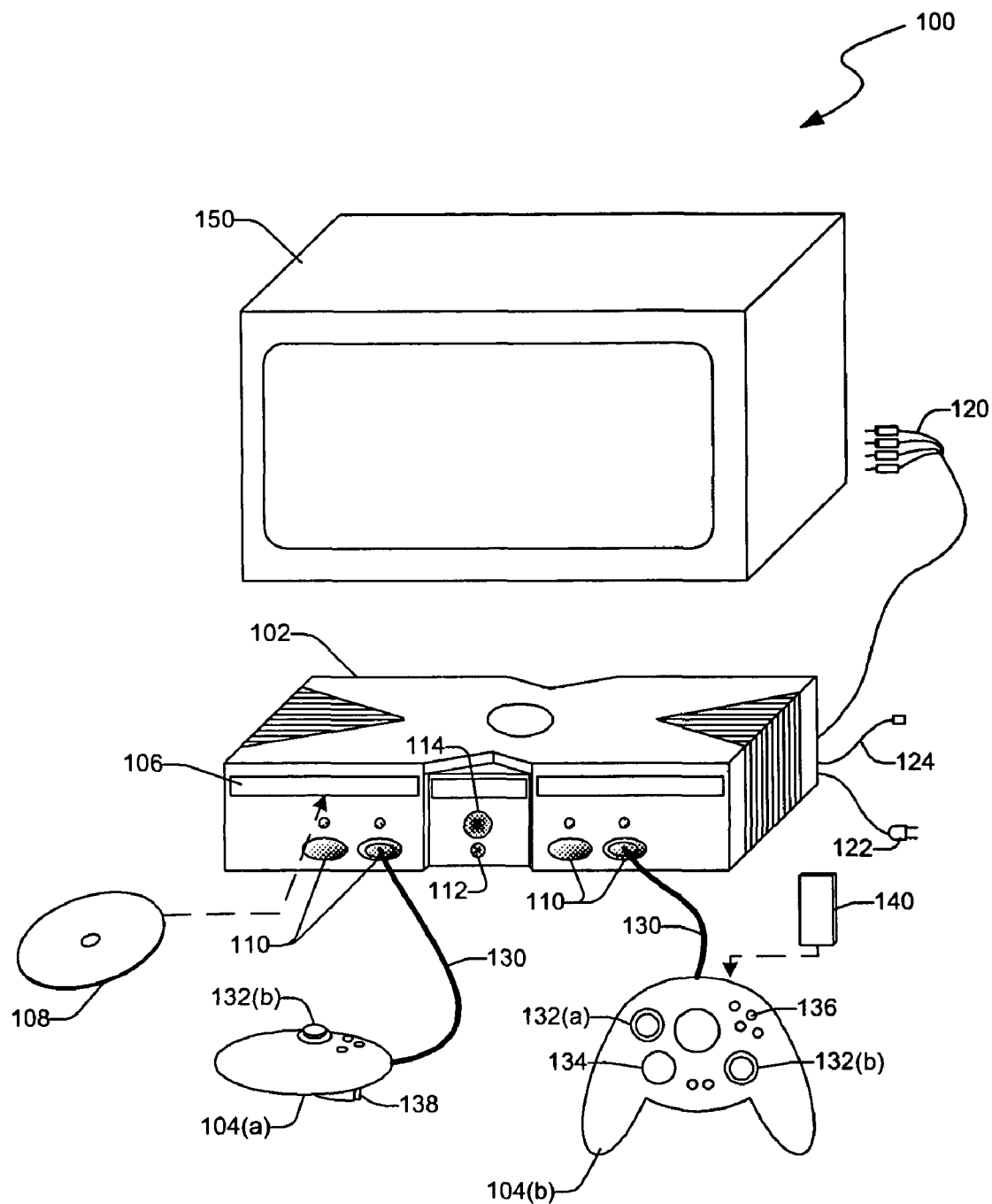
FIG. 1 is a schematic diagram illustrating a suitable gaming system on which computer games, video games, and/or other electronic games can be implemented in accordance with several embodiments of the invention.

FIG. 1 is a schematic diagram illustrating a suitable gaming system 100 on which computer games, video games and/or other electronic games can be implemented in accordance with several embodiments of the invention. In one aspect of this embodiment, the gaming system 100 includes one or more inceptors or controllers 104 (identified individually as a first controller 104a and a second controller 104b) operably connected to a game console 102. In the illustrated embodiment, the inceptors or controllers 104 are similar to hand-held controllers used in various computer and/or video games. In other embodiments, the gaming system 100 can include other types of inceptors or controllers 104, for example, one or more voice input systems, keyboards, touch screens, or position-sensing devices. The controllers 104 can be connected to the game console 102 via a wired or wireless interface. For example, in the illustrated embodiment, the controllers 104 are universal serial bus (USB) compatible and are connected to the console 102 via serial cables 130 received in sockets 110. The controllers 104 can be equipped with a wide variety of user-interaction mechanisms. For example, in the illustrated embodiment, each controller 104 includes two thumbsticks 132a and 132b, a D-pad 134, various buttons 136, and corresponding triggers 138. The foregoing mechanisms are merely illustrative of the various types of user-interaction mechanisms that can be included with the controllers 104. Accordingly, in other embodiments, other controllers can include more or fewer such mechanisms without departing from the spirit or scope of the present disclosure.

Each of the controllers 104 can be configured to accommodate two portable memory units 140 for portable storage capability. The memory units 140 enable users to store game parameters and import them for play on other game consoles. In the illustrated embodiment, each controller 104 is configured to accommodate two memory units 140. In other embodiments, however, suitable controllers can be configured to accommodate more or fewer memory units, including no memory units.

The game console 102 can include a plurality of cables for connection to supporting systems. For example, the game console 102 can be operably connected to a television or display 150 via audio visual interface cables 120. In addition, a power cable 122 can provide power to the game console 102. Further, a cable or modem connector 124 can facilitate information exchange between the game console 102 and a network, such as the Internet, for broadband data transmission.

The game console 102 can be equipped with an internal hard disk drive (not shown) and a portable media drive 106. The portable media drive 106 can be configured to support various forms of portable storage media as represented by an optical storage disk 108. Examples of suitable portable storage media can include DVD and CD-ROM game disks and the like. The game console 102 can further include a power button 112 and an eject button 114. Depressing the eject button 114 alternately opens and closes a tray associated with the portable media device 106 to allow insertion and extraction of the storage disk 108, or otherwise serves to facilitate removal of the portable storage media.

The gaming system 100 enables players and other users to enjoy various forms of entertainment including games, music, and videos. With the different storage options available, such media can be played from the hard disk drive, the portable media drive 106, the memory units 140, or an online source. For example, the gaming system 100 is capable of playing music from a CD inserted in the portable media drive 106, from a file on the hard disk drive, or from an online streaming source. Similarly, the gaming system 100 can also play a digital audio/video game from a DVD disk inserted in the portable media drive 106, from a file on the hard disk drive (e.g., a file in Active Streaming Format), or an online streaming source.

The gaming system 100 is but one example of a suitable system for implementing embodiments of the invention. Accordingly, the methods and systems disclosed herein are not limited to implementation on the gaming system 100, but extend to numerous other general or special purpose computing systems or configurations. Examples of well-known computing systems, environments, and/or configurations that may be suitable for use with aspects of the invention include personal computers (PCs), server computers, portable and hand-held devices such as personal digital assistants (PDAs), laptop and tablet PCs, multiprocessor systems, microprocessor-based systems, set top boxes, programmable consumer electronics, network PCs, mini-computers, mainframe computers, electronic game consoles, and distributed computing environments that include one or more of the above systems or devices.

Figure 2:
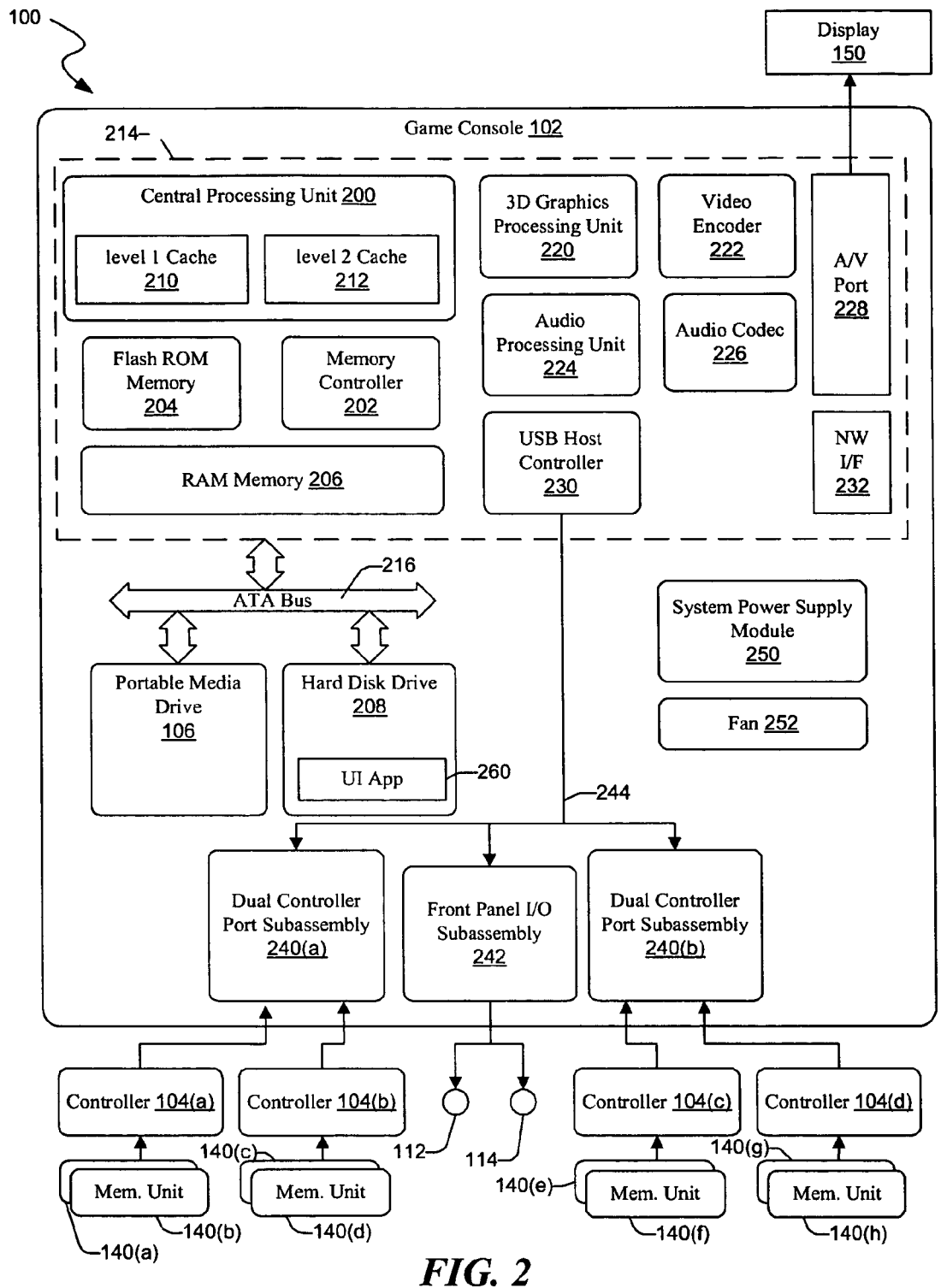
FIG. 2 is a block diagram illustrating functional components of the gaming system of FIG. 1 configured in accordance with an embodiment of the invention.

FIG. 2 is a block diagram illustrating functional components of the gaming system 100 configured in accordance with an embodiment of the invention. In one aspect of this embodiment, the game console 102 includes a central processing unit (CPU) 200 and a memory controller 202. The memory controller 202 can facilitate processor access to various types of memory. Such memory can include a flash Read Only Memory (ROM) 204, a Random Access Memory (RAM) 206, a hard disk drive 208, and the portable media drive 106. The CPU 200 can be equipped with a level one cache 210 and a level two cache 212 to temporarily store data and reduce the number of necessary memory access cycles, thereby improving processing speed and throughput. The CPU 200, the memory controller 202, and the various memory devices described above are interconnected via one or more buses, such as serial and parallel buses, memory buses, peripheral buses, and/or processor or local buses using any of a variety of bus architectures. Such architectures can include, for example, an Industry Standard Architecture (ISA), a Micro Channel Architecture (MCA), an enhanced ISA (EISA), a Video Electronics Standards Association (VESA) local bus architecture, and a Peripheral Component Interconnects (PCI) bus architecture also known as a mezzanine bus architecture.

In one embodiment, the CPU 200, memory controller 202, ROM 204, and RAM 206 can be integrated into a common module 214. In this embodiment, the ROM 204 is configured as a flash ROM that is connected to the memory controller 202 via a PCI bus and a ROM bus (neither of which is shown). The RAM 206 can be configured as a multiple Double Data Rate Synchronous Dynamic RAM (DDR SDRAM) that is independently controlled by the memory controller 202 via separate buses (not shown). The hard disk drive 208 and portable media drive 106 can be connected to the memory controller 202 via the PCI bus and an AT attachment (ATA) bus 216.

In the illustrated embodiment, a 3D graphics processing unit 220 and a video encoder 222 can form a video processing pipeline for high speed and high resolution graphics processing. Data can be carried from the graphics processing unit 220 to the video encoder 222 via a digital video bus (not shown). An audio processing unit 224 and an audio codec (coder/decoder) 226 can form a corresponding audio processing pipeline with high fidelity and stereo processing. Audio data can be carried between the audio processing unit 224 and the audio codec 226 via a communication link (not shown). The video and audio processing pipelines can output data to an audio/video (AN) port 228 for transmission to the display 150. In the illustrated embodiment, the video and audio processing components 220-228 are mounted on the module 214.

A USB host controller 230 and a network interface 232 can also be implemented on the module 214. The USB host controller 230 can be coupled to the CPU 200 and the memory controller 202 via a bus (e.g., a PCI bus), and serves as a host for peripheral controllers 104a-104d. The network interface 232 can provide access to a network (e.g., the Internet, a home network, etc.) and may be any of a wide variety of wire or wireless interface components including an Ethernet card, a modem, a Bluetooth module, a cable modem, and the like.

The game console 102 can include dual controller port subassemblies 240a and 240b, and each subassembly can support two corresponding peripheral controllers 104a-104d. A front panel I/O subassembly 242 supports the functionality of the power button 112 and the eject button 114, as well as any light emitting diodes (LEDs) or other indicators exposed on the outer surface of the game console 102. The subassemblies 240a, 240b, and 242 are coupled to the module 214 via one or more cable assemblies 244.

Eight memory units 140a-140h are illustrated as being connectable to the four controllers 104a-104d in a two memory units per controller configuration. Each memory unit 140 can offer additional storage on which games, game parameters, and other data may be stored. When inserted into a controller, the memory unit 140 can be accessed by the memory controller 202. A system power supply module 250 can provide power to the components of the gaming system 100, and a fan 252 can cool the circuitry within the game console 102.

The game console 102 described above can implement a uniform media portal model that provides a consistent user interface and navigation hierarchy to move users through various entertainment areas. The portal model offers a convenient way to access multiple different types of media content including game data, audio data, and video data regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console. Aspects of the UI application and some of the exemplary screen displays it presents are described below in more detail.

Figure 3:
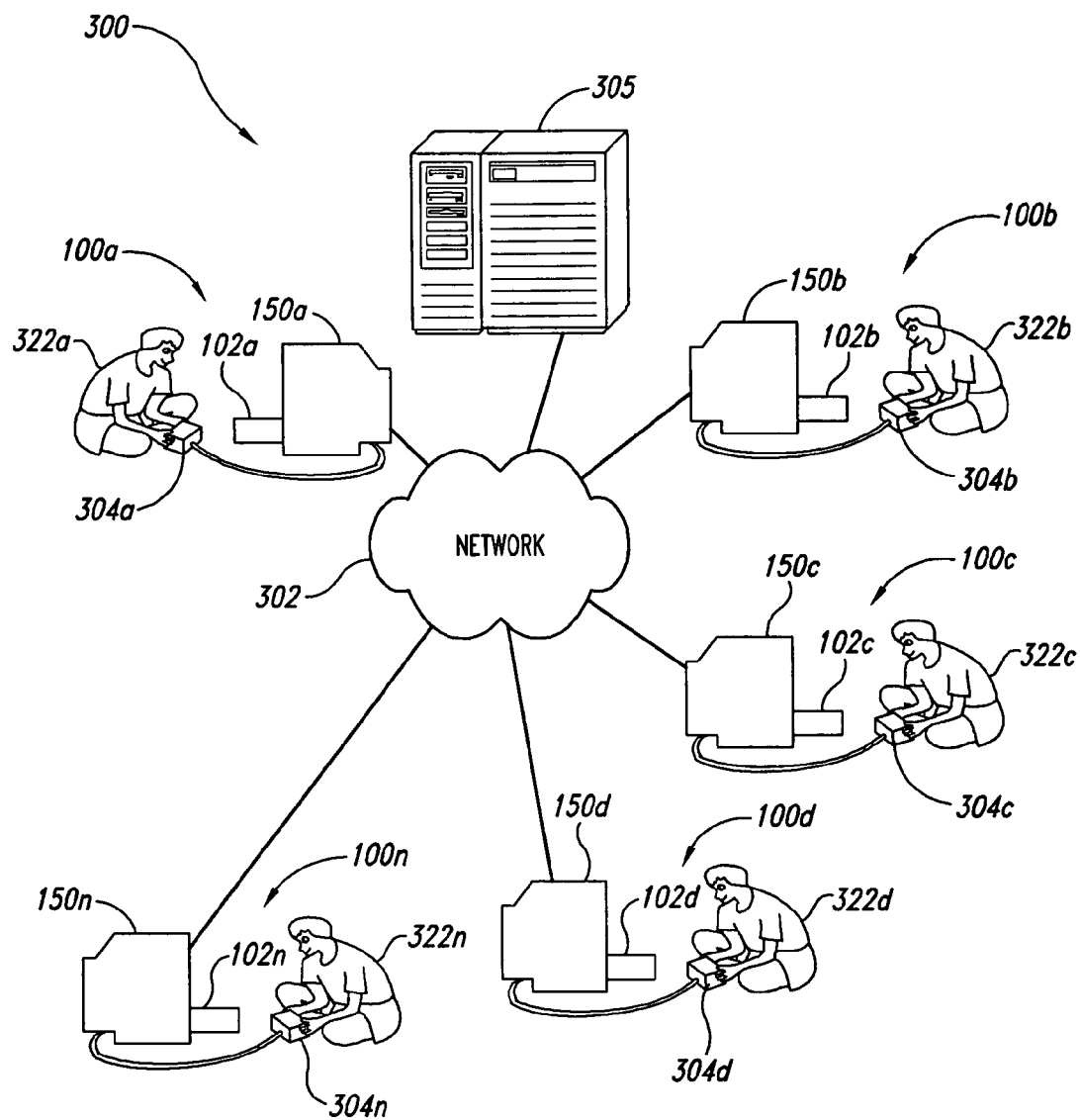
FIG. 3 is a schematic diagram of a network-based gaming environment suitable for implementing various embodiments of the invention.

The gaming system 100 may be operated as a standalone system by simply connecting the system to the display 150. In the standalone mode, the gaming system 100 allows one or more players operating the controllers 104 to play games and view them on the display 150. With the broadband connectivity made possible via the network interface 232, however, the gaming system 100 can also be operated in a larger, network-based gaming community, as described in detail below. For example, FIG. 3 is a schematic diagram of a network-based gaming environment 300 suitable for implementing various embodiments of the invention. In the illustrated embodiment, the gaming environment 300 includes a plurality of the gaming systems 100, 100a-n interconnected via a network 302. Each gaming system 100a-n is shown with a corresponding player 322a-n using a corresponding controller or inceptor 304a-n to interface with the corresponding gaming system 100a-n. As discussed above with reference to FIG. 1, the inceptors 304a-n can include a hand-held controller, voice input system, keyboard, mouse, touch screen, and/or position-sensing device. In certain embodiments, the inceptors 304a-n can be integrated with and/or into various portions of the gaming systems 100a-n (e.g., the inceptor 304a-n can be integrated into the displays 150a-n and/or game consoles 102a-n). In other embodiments the gaming systems 100a-n can include multiple inceptors 304a-n and/or be used by multiple players 322a-n.

The network 302 represents any of a wide variety of data communications networks and may include public portions (e.g., the Internet) and/or private portions (e.g., a residential Local Area Network (LAN)). Further, the network 302 may be implemented using any one or more of a wide variety of conventional communications configurations including wired and/or wireless types. Any of a variety of communications protocols can be used to communicate data via network 302, including both public and proprietary protocols (e.g., TCP/IP, IPX/ISPX, and/or NetBEUI). Each of the gaming systems 100 can also be connected to a server computer 305. The server computer 305 can include a number of facilities for performing various aspects of the game and/or the targeting features discussed below.

Figure 4:
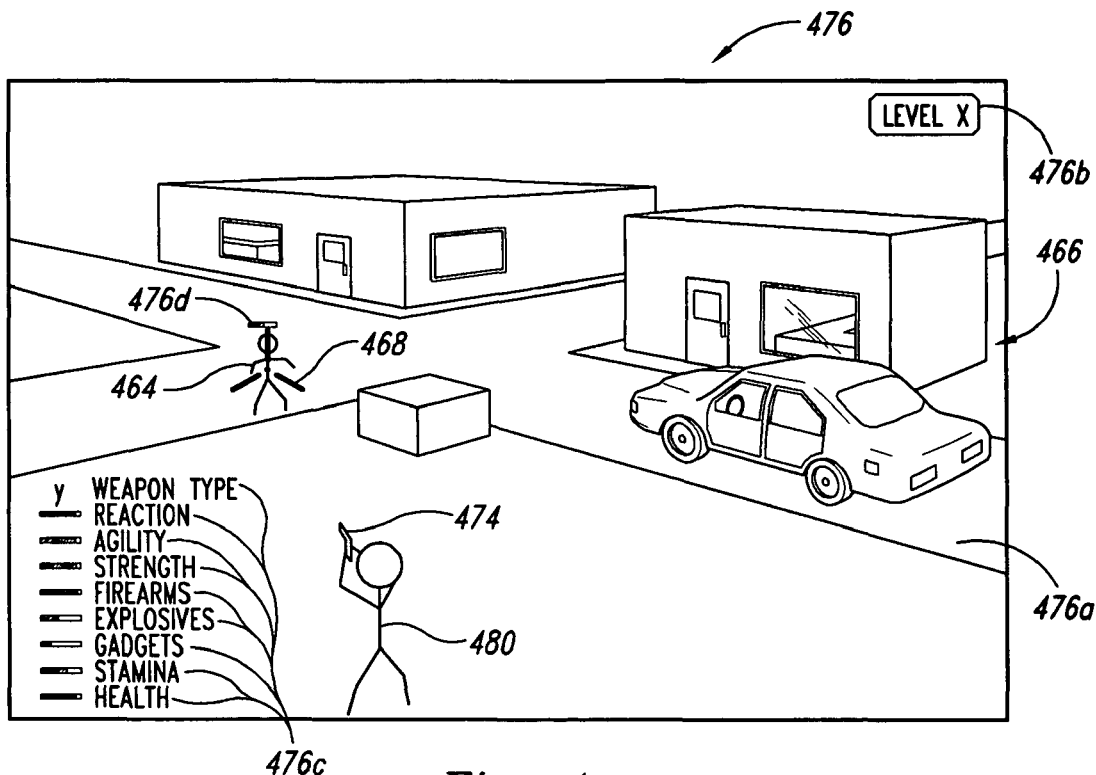
FIG. 4 is a schematic illustration of a player's field of view on the display of a gaming system in accordance with an embodiment of the invention.

FIG. 4 is a schematic illustration of a player's field of view 466 on a display of a gaming system in accordance with embodiments of the invention. In FIG. 4, a character 480, controlled by a player, has a weapon 474 which will apply a game action proximate to (e.g., at, through, toward, and/or around) the aiming reference 468. The aiming reference 468 can include a specific point or area proximate to where the game action will occur. For example, the weapon 474 can include a laser rifle that shoots a laser beam through the aiming reference 468. The player can control the aiming reference 468 through an inceptor, as discussed above, which can include a hand-held controller, a voice input system, a touch screen, and/or a position-sensing device. For example, a position-sensing device can include a physical device that the player holds and points at the display of the gaming system. The position of the device can be sensed (e.g., via Infrared light sensors) and can move the aiming reference 468 in the display.

In the illustrated embodiment, the character 480 is shown as a humanoid, but in other embodiments the character can include other simulated life forms and/or non-life forms (e.g., a robot or a vehicle). In still other embodiments, the weapon 474 can be selectable within the game (e.g., the player can select between a flame thrower, laser rifle, and conventional rifle). In still other embodiments, a different type of game action can be applied at the aiming reference 468 and the weapon 474 can be eliminated. For example, the game action can include a punch and the character 480 can punch at the aiming reference 468 when the game action is commanded.

In the illustrated embodiment, a third person perspective of the player's character is provided. In other embodiments, other perspectives can be used. In one embodiment, a first person perspective can be displayed where the player can see the aiming reference 468 and/or a portion of the character's weapon, but not the player's character.

In certain embodiments, the aiming reference 468 can be used to move a camera or the player's field of view 466 so that the player can scan the game environment (e.g., look around in the game) by moving the aiming reference 468. In other embodiments, the aiming reference 468 can be decoupled from the player's ability to look around or move the field of view 466. For example, the aiming reference can be controlled by a thumbstick and the movement of the player's field of view 466 can be controlled by a D-pad.

In other embodiments, the aiming reference can include other forms (e.g., brackets) or be invisible to the player. For example, when using a position-sensing device, as described above, the player can be required to use a sight system on the position-sensing device to aim at an object in the player's field of view 466 without an aiming reference 468 being displayed in the player's field of view 466. In this example, although movement of the position-sensing device causes an aiming reference 468 to move to various areas where game action will occur if game action is commanded, the aiming reference is not displayed to the player.

Additionally, the gaming system can include various game attributes 476, including the demonstrated skill level of the player, the game level that the player has achieved, the weapon that the player has chosen, game environmental characteristics (e.g., line of site, barriers, buildings, and other objects in the game), object characteristics (e.g., the health and/or strength of the object), and the ability of objects to merge with other objects and/or morph into other forms. For example, in the illustrated embodiment, game attributes include the gaming environment 476a, the game level 476b, the player's character's characteristics 476c (including the player's weapon choice), and the object's health 476d. The various game attributes 476 can affect the game play and/or the functions of various aspects of the game.

Figure 5:
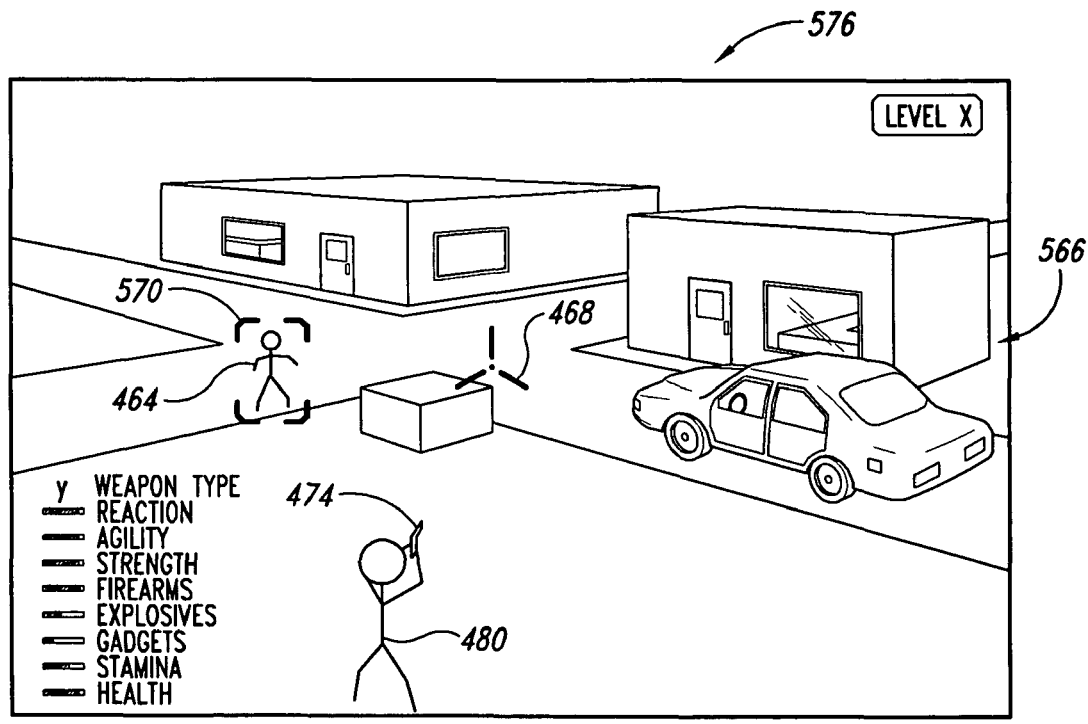
FIG. 5 is a schematic illustration of a player's field of view on a display of a gaming system after a soft lock has been applied to the object shown in FIG. 4, in accordance with an embodiment of the invention.

As discussed above, it can be difficult for a player to simultaneously move around in the game, look around in the game, and shoot during game play. Accordingly, it can be desirable to include a soft lock mode in the game, which allows a player to target or designate an action site while continuing to move the aiming reference and/or the player's field of view within the game. In one embodiment, to apply a soft lock, the player commands the aiming reference 468 to be placed on at least a portion of the object 464 and commands a soft lock. FIG. 5 is a schematic illustration of the object 464, shown in FIG. 4, after a soft lock has been applied. In the illustrated embodiment, the action site 570, which is the location where a selected game action will occur if commanded by the player, is depicted by four corner brackets.

In FIG. 5, the soft lock has been applied to a selected portion of the object 464, and the aiming reference 468 has been moved away from the object 464. While the object 464 is soft locked, the player can move the aiming reference 468 away from the object, but the action site 570 remains on or proximate to the selected portion of the object. In the illustrated embodiment, while the object is soft locked, if the player commands the selected game action, the game action will occur at least proximate to the action site 570 regardless of where the aiming reference 468 is located. This feature can be especially useful when, in addition to aiming the player's weapon, the aiming reference 468 is used to control the movement of the player's character and/or the movement of the player's field of view. Additionally, in certain embodiments, this feature can allow the player to aim at other objects in the game and subsequently decide whether to disengage the soft lock and shoot at a new target or to retain the soft lock. In certain embodiments, the soft lock is maintained even though the player's field of view 566 is moved such that the object 464 is no longer displayed within the field of view 566.

In the illustrated embodiment, the action site 570 is depicted by four corner brackets surrounding the object. In other embodiments, the action site 570 can be shown in other manners, for example, by using different symbology, shading, coloring, ghosting, outlining, labels, alpha-numeric messages, and/or a status block. In certain embodiments, when a soft lock is commanded, the action site 570 encompasses the entire object. In other embodiments, the soft lock is a selected size (e.g., area) and when applied, only encompasses the selected area.

The specific game attributes that exist at the time the soft lock is commanded can determine various characteristics of the soft lock. For example, the size of the action site 570 may vary depending on the demonstrated marksmanship of the player and/or the choice of weapon. In certain embodiments, a smaller action site 570 can be desirable because it allows the player to more precisely target a selected portion of the object 464 (e.g., when the game action only occurs in a portion of the action site). In other embodiments, a larger action area 570 can be desirable because the game action occurs over the entire area of the action site (e.g., when the player uses a flame thrower). In certain embodiments, the ability for a player to apply a soft lock to an object 464 may be unavailable until certain game attributes 576 are satisfied (e.g., the player reaches a selected level in the game and/or the entire object is within the player's field of view).

Figure 6:
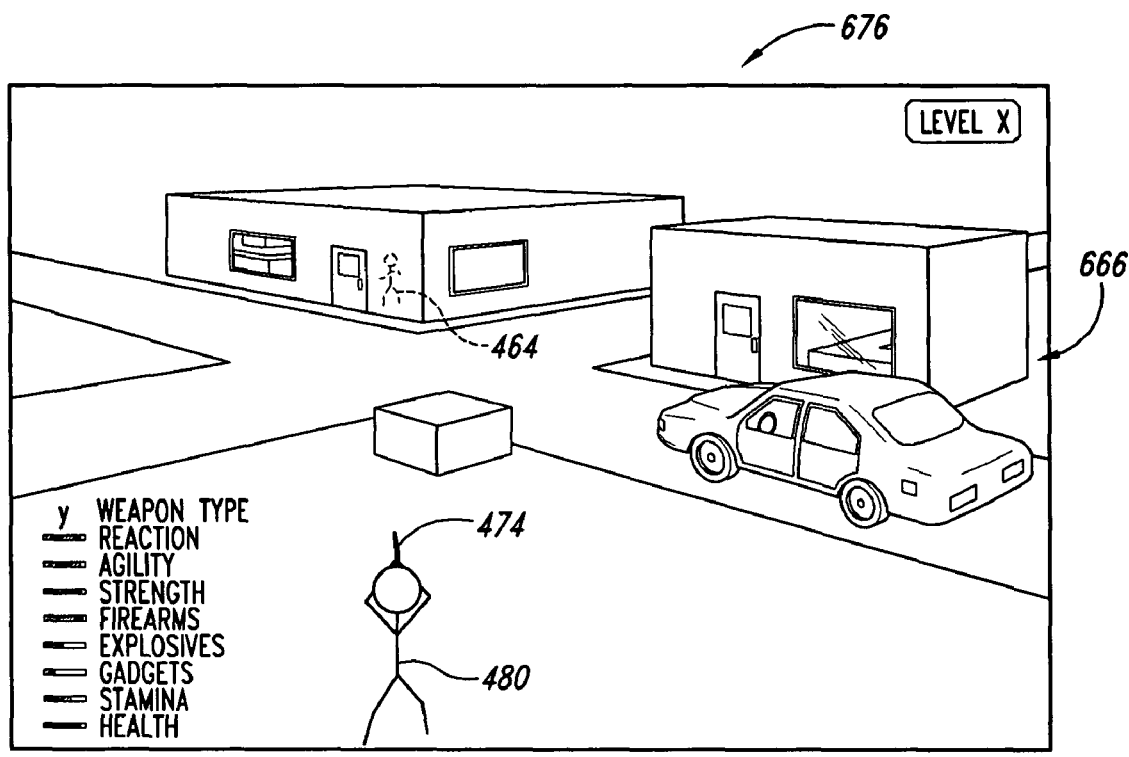
FIG. 6 is a schematic illustration of the object in FIG. 5 where the object has moved in the game to enter a building, thereby disengaging the soft lock.

In other embodiments, the game attributes can also determine an automatic disengagement of the soft lock. For example, as shown in FIG. 6, the game attributes 676 have changed from the attributes 576 shown in FIG. 5 because the object 464 has entered a building. Because the player no longer has a clear, unobstructed shot at the objects, the soft lock on the object 464, as shown in FIG. 6, has been automatically disengaged. In other embodiments, the soft lock can remain engaged when the object 464 is outside a player's field of view 666 and/or when certain game attributes 676 are present, but the player is prevented from applying a selected game action until the player moves the field of view 666 to include the object 464 and/or until certain gaming attributes 676 are present.

Once a soft lock is selected, the inceptor attributes can also change. For example once a soft lock is applied, the control functionality (e.g., what the trigger commands on a hand-held controller or what a word commands on a voice input device) and/or the control characteristics (e.g., the rate at which commands are carried out) can change. In one embodiment, once a player applies a soft lock to an object and the player has moved the field of view away from the object, a selected button can be used to look back at the soft locked object (e.g., to provide a field of view including the soft locked object). In other embodiments, a player can soft lock a first weapon on a target (as indicated by an action site) and use the aiming reference to aim a second weapon. In still other embodiments, a player can apply multiple soft locks to multiple targets (e.g., soft lock two separate weapons to two corresponding objects).

Figure 7:
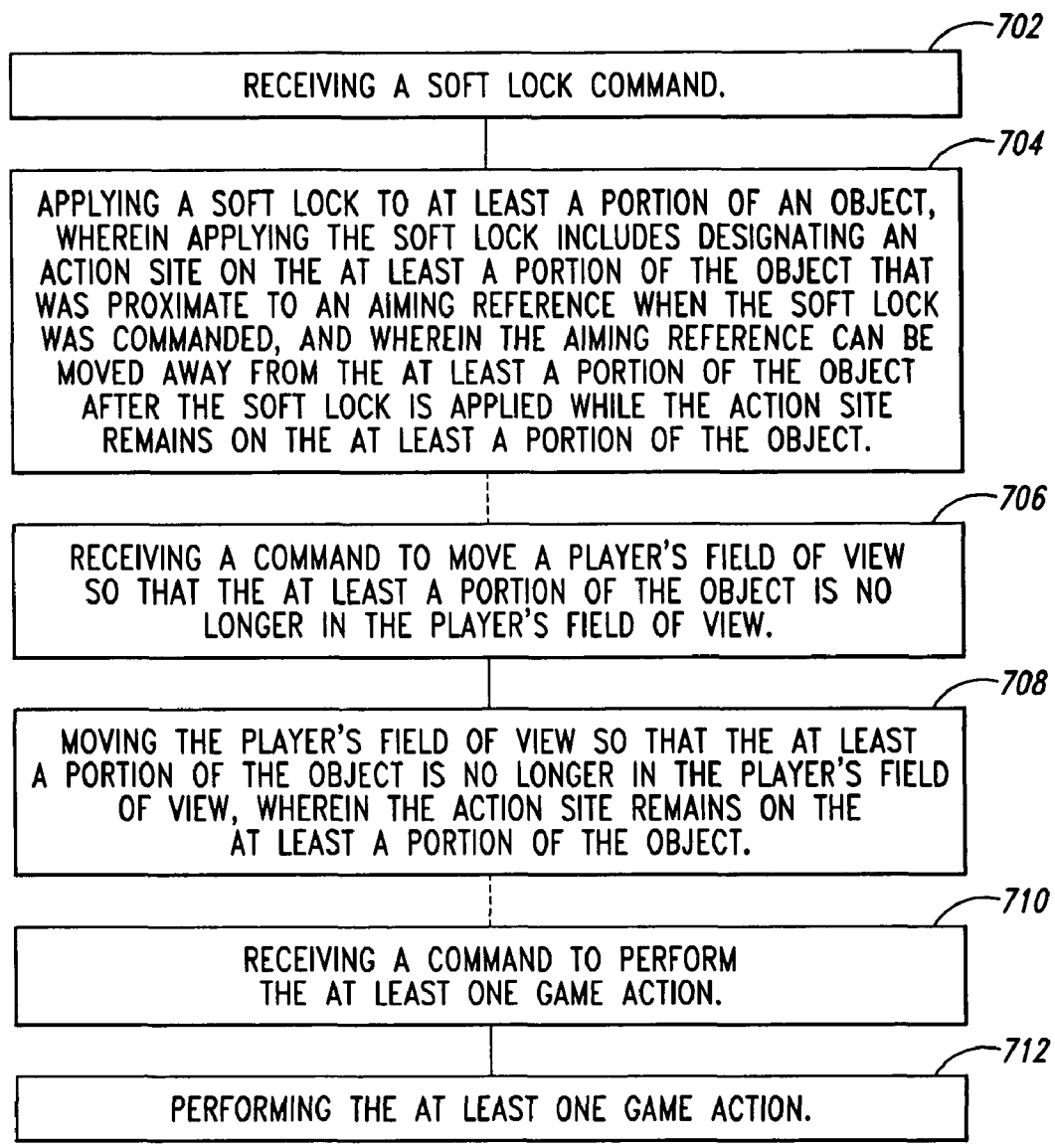
FIG. 7 is a flow diagram illustrating processes associated with applying a soft lock in accordance with embodiments of the invention.

FIG. 7 is a flow diagram illustrating methods and processes for implementing and/or using embodiments of the soft lock feature described above. These processes can be computer-implemented and/or computer readable mediums can be created to carry out these processes. It is understood that the process portions illustrated in FIG. 7 can be used singularly or in combination.

In one embodiment, process portion 702 includes receiving a soft lock command. Process portion 704 includes applying a soft lock to at least a portion of an object, wherein applying the soft lock includes designating an action site on the at least a portion of the object that was proximate to an aiming reference when the soft lock was commanded. Once the soft lock has been applied, the aiming reference can be moved away from the portion of the object, while the action site remains on the portion of the object.

In further embodiments, process portion 706 can include receiving a command to move a player's field of view so that the at least a portion of the object is no longer in the player's field of view. Process portion 708 includes moving the player's field of view so that the at least a portion of the object is no longer in the player's field of view, wherein the action site remains on the portion of the object. In still further embodiments of the invention, process portion 710 includes receiving a command to perform the at least one game action, and process portion 712 includes performing the at least one game action.

One feature of embodiments described above is that players can soft lock a target and perform other game tasks (including complicated and/or high workload tasks) while retaining the ability to engage the target at some later time without having to reacquire and aim at the target. This can provide the player with better situational awareness and more fluid game play. An advantage of this feature is that the player can be more competitive and/or have a more rewarding game experience. An additional advantage is that game designers can create more complex and interesting games, while maintaining player situational awareness and workload at an acceptable level.

Figure 8:
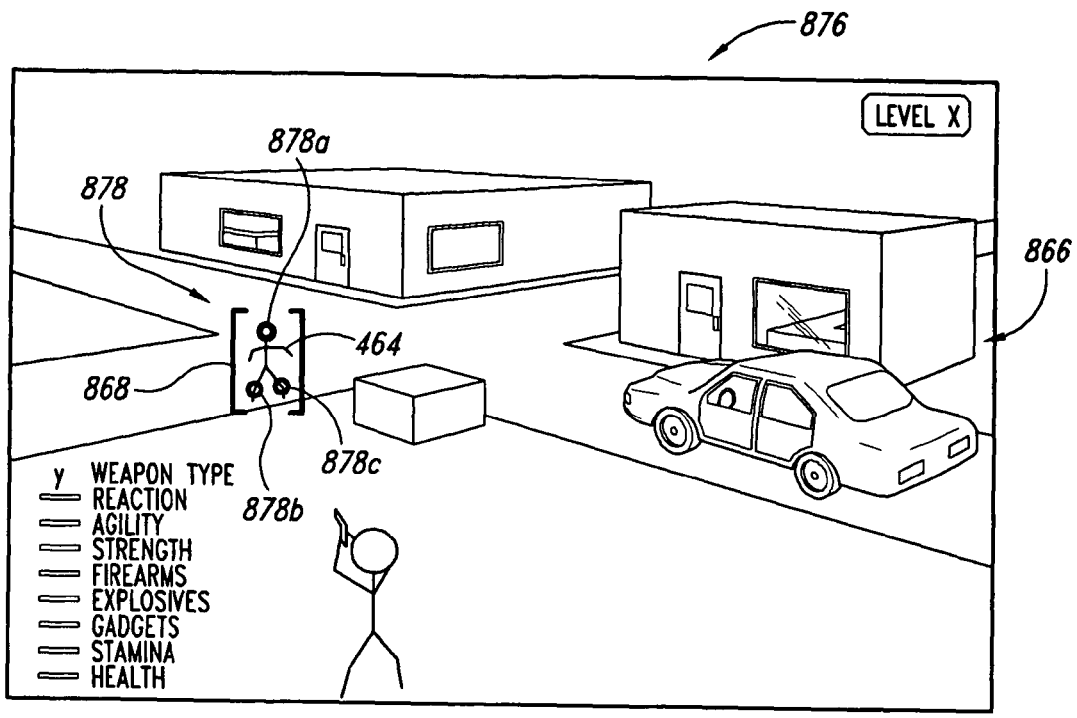
FIG. 8 is a schematic illustration of a player's field of view in a gaming system where a hard lock has been applied to an object, in accordance with another embodiment of the invention.

In certain situations it can be desirable to hard lock an object or a portion of an object so that the aiming reference 868 remains on and/or proximate to at least a portion of the object, as shown in FIG. 8. In the illustrated embodiment, when a portion of an object 464 is hard locked, the aiming reference 868 remains proximate to the portion of the object 464 and the player's field of view is moved (e.g., the player's character moves) so that the at least a portion of the object remains in the player's field of view. Other embodiments can have other arrangements. For example, in one embodiment, the aiming reference 868 remains at least proximate to the object 464 while the object 464 moves, however, the player has to move the player's field of view 866 and/or the player's character to keep the object 464 in the player's field of view 866 or the hard lock is automatically disengaged. In another embodiment, the player's character will follow the object 464, but the player will be able to move the character a limited amount relative to the object 464. For example, in one embodiment, the player can move the character a few feet closer, further away, left or right relative to the object. While the object 464 is hard locked, if commanded, game action will occur proximate to the aiming reference 868.

A hard lock can be engaged by placing the aiming reference 868 on at least a portion of an object 464 and commanding the hard lock engagement. In some embodiments, the aiming reference 868 can change shapes to indicate that the object 464 (or portions of the object 464) is hard locked. For example, in the illustrated embodiment, the aiming reference 868 includes two full height brackets indicating a hard lock. In other embodiments, the hard lock engagement can be shown in other ways, for example, by using different symbology, shading, coloring, ghosting, outlining, labels, alpha-numeric messages, and/or a status block. In certain embodiments, the availability or engagement of the hard lock feature can be predicated on various game attributes 876 (e.g., game environmental factors, character attributes, and/or object health). For example, in one embodiment, a hard lock can be unavailable to a player until the player has reached a certain level in the game. In another embodiment, if an object 464 is hard locked and enters a building where the player's character is unable to follow, the hard lock is automatically disengaged, similar to the soft lock scenario discussed above with reference to FIG. 6. In still other embodiments, the size of the area included in the hard lock can vary on the selected weapon. For example, a larger area can be included when a flamethrower is the selected weapon than when a rifle is the selected weapon.

In other embodiments, the gaming system can include a soft lock feature, as discussed above, and a hard lock can be applied to an object that has already been soft locked. For example, the hard lock can be applied to the action site associated with the soft lock, even if the object 464 is not in the player's field of view (e.g., upon engagement of the hard lock, the player's field of view 866 is moved to include the object 464 and the aiming reference symbol 868 is placed proximate to the object 464). In another embodiment, the player can transition from a soft lock to a hard lock, but only when the aiming reference 868 and the object 464 are both in the player's field of view 866. In yet another embodiment, a gaming system includes a soft lock feature, but a player cannot transition from a soft lock directly to a hard lock (e.g., the soft lock must be deselected before a hard lock can be engaged). In still other embodiments, a hard lock can only be entered from a soft lock and when a hard lock is deselected (manually or automatically) the soft lock is automatically re-engaged.

Figure 9:
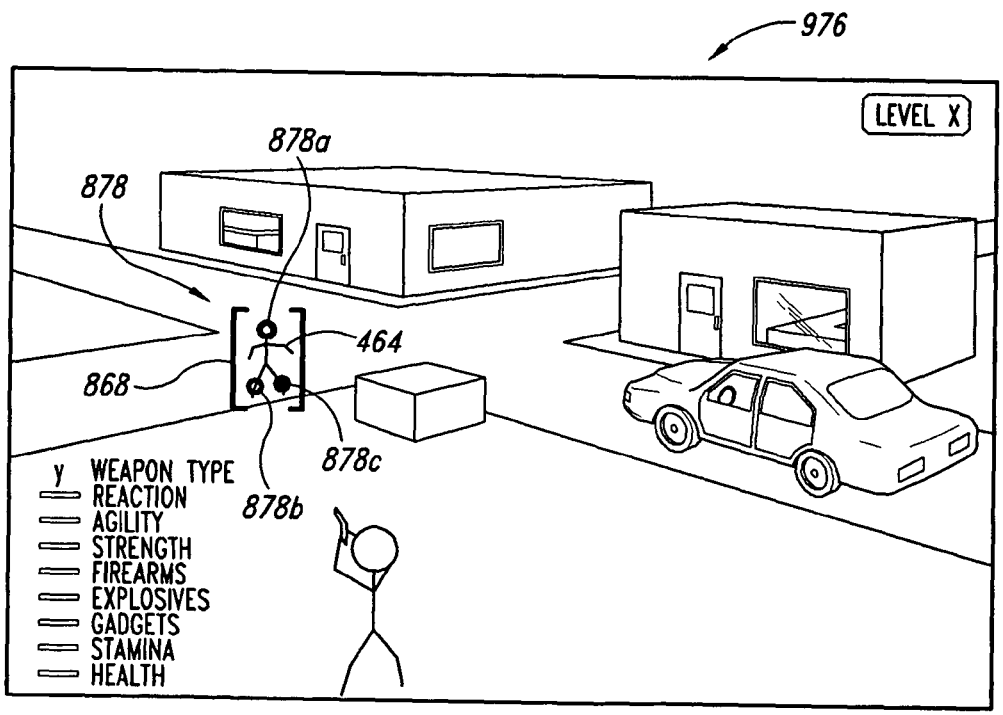
FIG. 9 is a schematic illustration of the object in FIG. 8 where a sub-target has been selected.

Once a hard lock is engaged, various sub-targets 878 can be displayed and used to allow the player to identify and/or target specific portions of the object that is hard targeted. For example, in FIG. 8 the player can choose and/or select among three sub-targets 878a-c (other embodiments can have more or fewer sub-targets). For example, the player may select the head portion of the object 878a and then later select the object's left knee 878c. In FIG. 9, the object's left knee 878c has been selected, as indicated by the filled circle. In other embodiments, the player must deselect the hard lock feature and reselect the hard lock feature in order to select a new sub-target 878. In other embodiments, a selected sub-target 878 can be indicated in other ways, including using different symbology, shading, coloring, ghosting, outlining, labels, alpha-numeric messages, and/or a status block. In certain embodiments, the player is free to select, deselect, and/or reselect among the sub-targets 878.

Selection of a sub-target can be accomplished through an inceptor, for example, by toggling through each sub-target using a cursor, selecting items from a menu, and/or through a voice input. For example, in one embodiment a joy stick is used to move an aiming reference 868 (similar to the aiming reference shown in FIG. 4) prior to applying a hard lock to the object 464. Once a hard lock is applied, the aiming reference 868 changes shape, multiple sub-targets 878 are displayed, and the joy stick is used to select one of the displayed sub-targets 878. Once a sub-target 878 is selected, it is the action site, proximate to the aiming reference 868, where game action will occur if game action is commanded. In other embodiments, other inceptor attributes can change once a hard lock is applied and/or once a sub-target 878 is selected. For example, once a hard lock is applied, the control functionality (e.g., what the trigger commands on a hand-held controller or what a word commands on a voice input device) and/or the control characteristics (e.g., the rate at which commands are carried out) can change.

Engagement, disengagement, and the availability of sub-targets 878 can be affected by one or more game attributes 976 (e.g., game environmental factors, character attributes, and/or object health). For example, there can be numerous sets of sub-targets 878 available for each object 464 and/or portion of an object 464, and the specific set of sub-targets 878 that is shown can depend on various game attributes 876. For example, fewer sub-targets 878 for the object 464 can be shown to a player who has demonstrated a lower level of marksmanship and more sub-targets 878 can be shown for the object 464 when the player has demonstrated a higher level of marksmanship.

Figure 10:
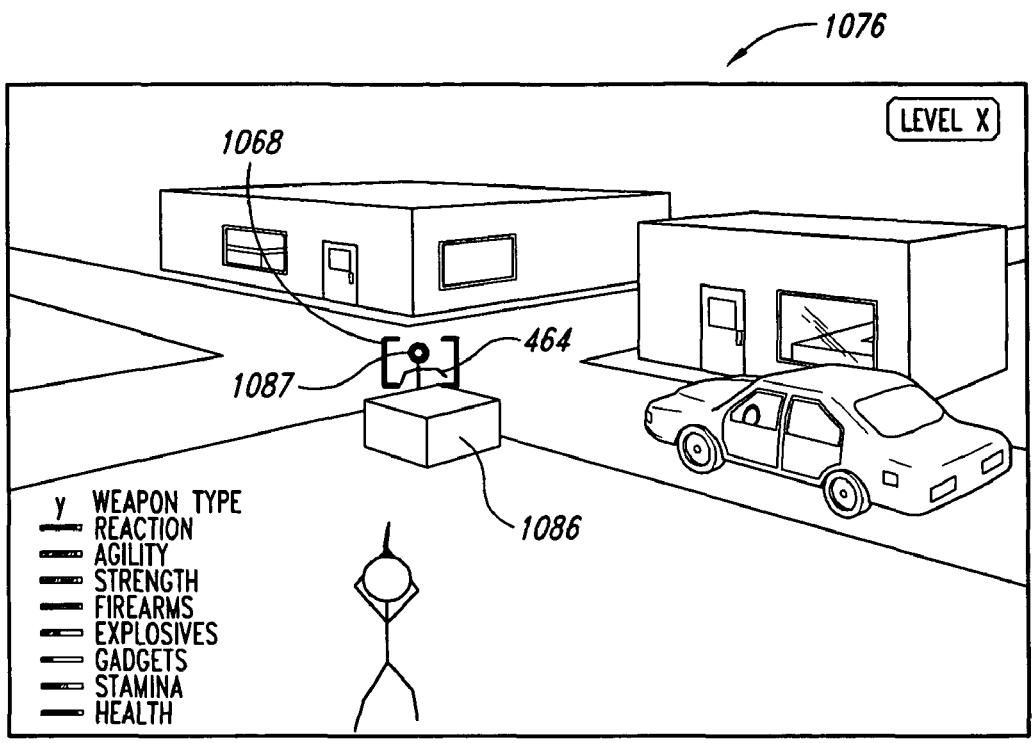
FIG. 10 is a schematic illustration of the object shown in FIGS. 8 and 9, where the object has moved and a portion of the object is behind a barrier.
Figure 11:
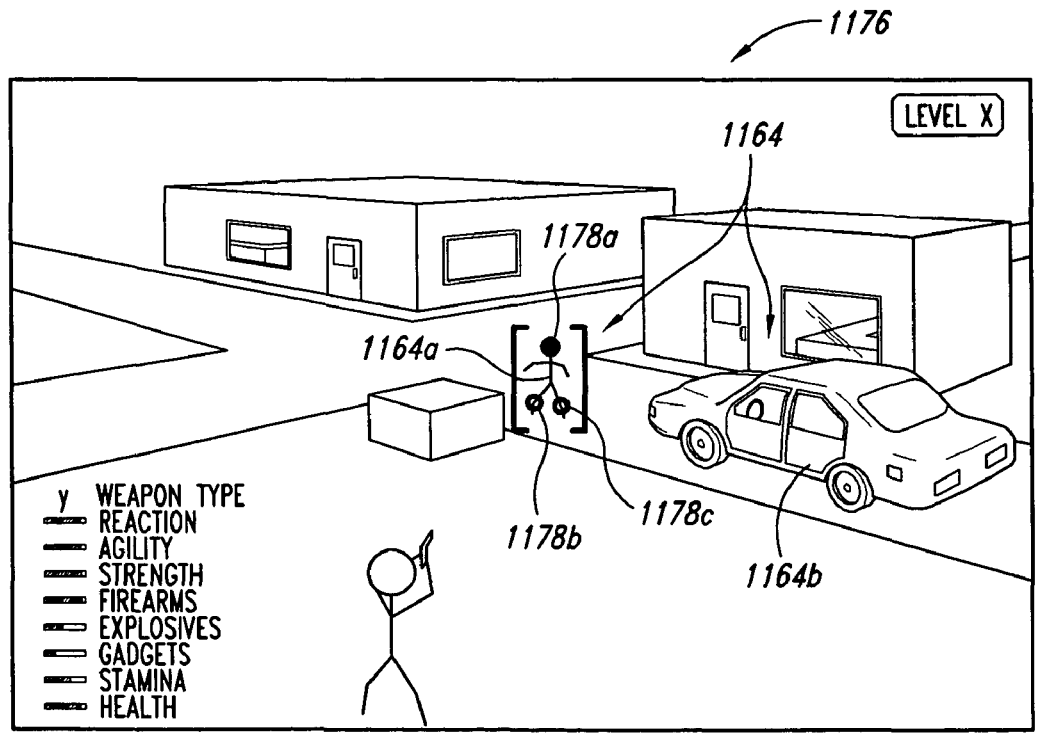
FIG. 11 is a schematic illustration of a first object and a second object, where the first object has been hard locked and a sub-target has been selected, in accordance with yet another embodiment of the invention.

In another embodiment, shown in FIG. 10, the object 464, shown in FIG. 9, has moved behind a barrier 1086 changing the game attributes 1076. Corresponding to this change in the game attributes 1076, the number of available sub-targets 1087 have been reduced to one and the sub-target that had been selected (the object's left knee 878c, shown in FIG. 9) has been disengaged, however, the hard lock has remained engaged. In other embodiments, if the selected sub-target is disengaged by a game attribute 1076 as shown in FIG. 10, the hard lock is also automatically disengaged.

Additionally, as shown in FIG. 10, when the targeted object 464 moves behind the barrier 1086, the size of the aiming reference 1068 can be reduced (as compared to the aiming reference 868 shown in FIGS. 8 and 9). This reduction in size can indicate that the area where game action will/can occur has been reduced (e.g., if the player has selected a flame thrower as a weapon it would impact on less of the object 464). In other embodiments, the size of the aiming reference 1068 may not change when the object moves behind the barrier 1086 (e.g., the aiming reference can include portions of the object 464 and the barrier 1086). Accordingly, if commanded, the game action will impact the barrier 1086 and/or the object 464 (e.g., if the player has chosen a rifle as a weapon, the bullets can impact randomly within the area defined by the aiming reference, impacting the object 464 and/or the barrier 1086). In still other embodiments, the size of the aiming reference 1068 may not correspond directly to the size of the area where game action will/can occur and only indicates the proximity where the game action occurs (e.g., game action can occur outside, but proximate to, the area defined by the aiming reference).

Figure 12:
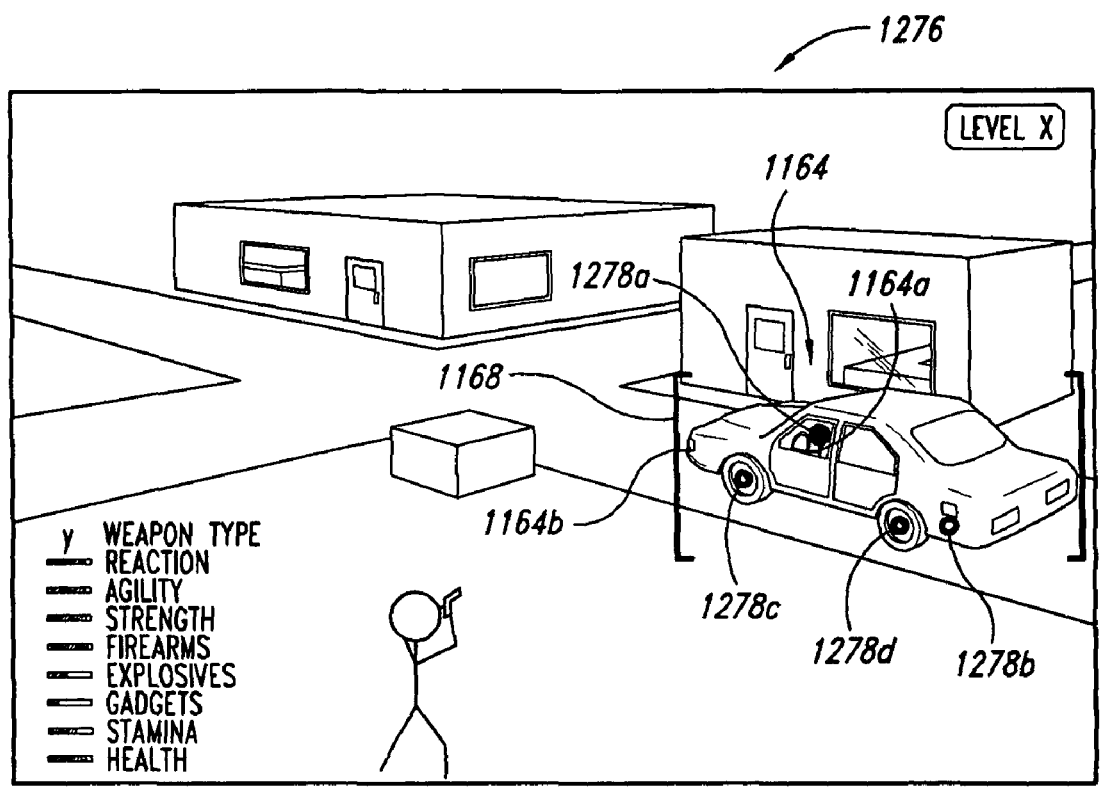
FIG. 12 is a schematic illustration of the first and second objects shown in FIG. 11, where the two objects have merged.

In still other embodiments, the game attributes that affect the hard lock and associated sub-targets can include an object combining with another object and/or an object morphing into a different shape or object. For example in FIG. 11, there are two objects 1164, shown as a first object 1164a (e.g., a person) and a second object 1164b (e.g., a car). The first object 1164a has been hard targeted and three selectable sub-targets 1178a-c have been displayed. Additionally, the player has selected the head sub-target 1178a on the first object 1164a. In FIG. 12, the first object 1164a has entered the second object 1164b, changing at least one game attribute 1276 from the game attributes 1176 shown in FIG. 11 (e.g., the first and second targets 1164a, 1164b have merged).

In the illustrated embodiment, the merger of the first and second objects 1164a, 1164b has caused the two targets to be treated as a single target and the hard lock has transitioned to the merged objects 1164a, 1164b (e.g., the aiming reference 1168 surrounds the first and second objects 1164a, 1164b). The merged objects 1164a, 1164b now include a new set of sub-targets 1278a-d based on the new game attributes 1276. Because the head of the first object 1164a was the selected sub-target before the objects merged, it has remained targeted (shown as the head sub-target 1278a in FIG. 12). In other embodiments, if a selected sub-target of an object is blocked by the merger of an object, the sub-target can be deselected when the hard lock transitions to the merged objects 1164a, 1164b and/or the hard lock can be disengaged when the objects 1164a, 1164b merge. In still other embodiments, even if the selected sub-target is viewable after the objects merge, the sub-target selection can be lost and/or the hard lock can be disengaged. In yet other embodiments, an object can morph into other configurations and/or presentations and the hard lock and sub-target selection/engagement can work in a manner similar to the merger of two objects.

Figure 13:
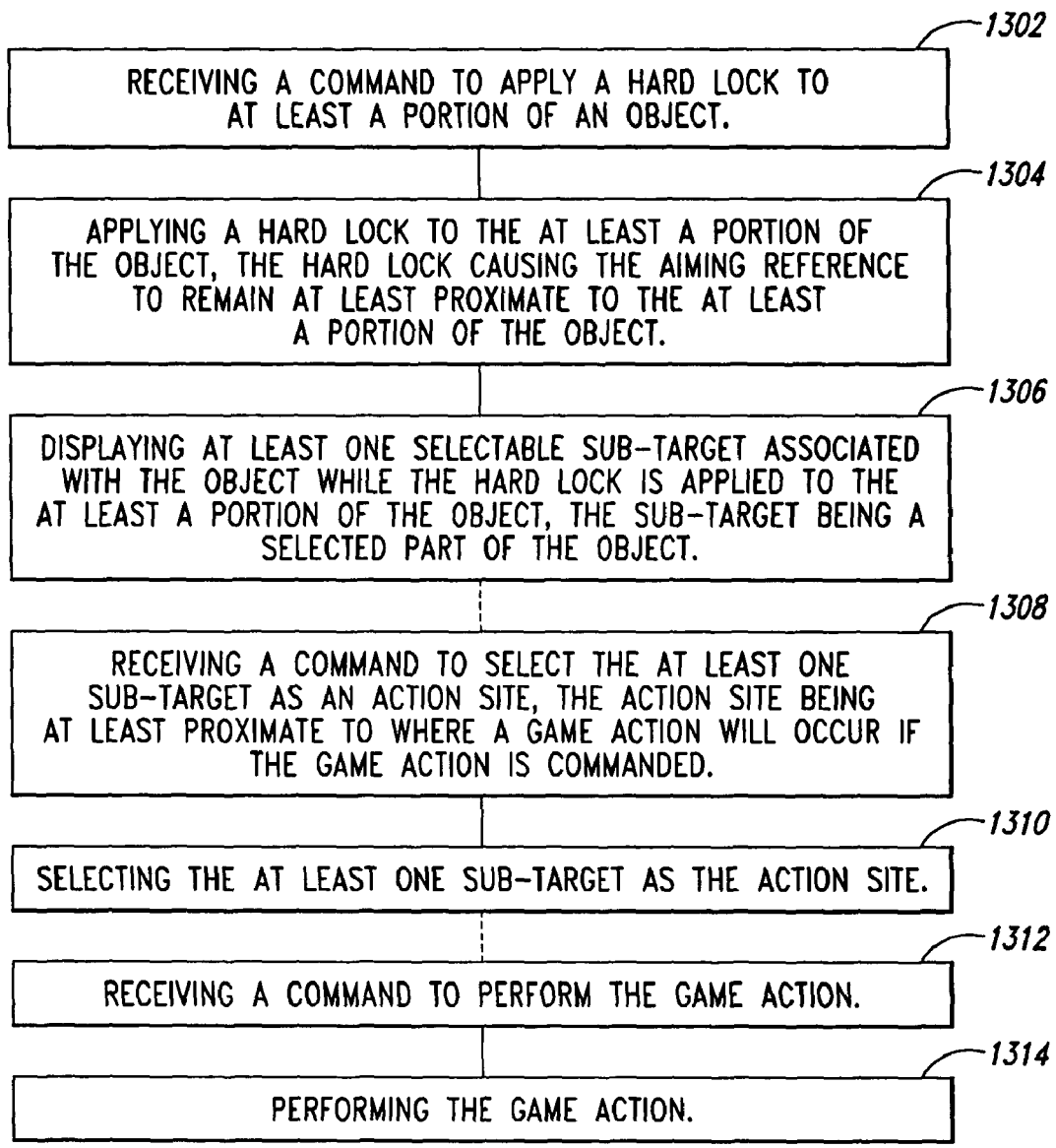
FIG. 13 is a flow diagram illustrating process associated with applying a hard lock to an object in accordance with other embodiments of the invention.

Accordingly, FIG. 13 illustrates various process portions that can be used singularly or in combination in a computer implemented method and/or stored on a computer-readable medium. Process portion 1302 can include receiving a command to apply a hard lock to at least a portion of an object. As discussed above, the command to apply the hard lock can be a command to hard lock a portion of an object that is designated as an action site on an object that is soft locked and/or can be a command to apply a hard lock to a portion of the object that is proximate to an aiming reference. Process portion 1304 can include applying a hard lock to the at least a portion of the object, the hard lock causing the aiming reference to remain proximate to the at least a portion of the object. Process portion 1306 can include displaying at least one selectable sub-target associated with the object while the hard lock is applied to the at least a portion of the object. The sub-target can be a selected part of the object.

The process can include additional process portions. For example, process portion 1308 includes receiving a command to select at least one sub-target as an action site, the action site being at least proximate to where a game action will occur if the game action is commanded. Process portion 1310 can include selecting the at least one sub-target as the action site. Process portion 1312 can include receiving a command to perform the game action and process portion 1314 can include performing the game action.

One feature of embodiments described above is that critical areas of a selected object can be identified to the player as sub-targets. These critical areas may otherwise be unknown to the player. Another feature of embodiments described above is that applying a game action to a selected sub-target area can have unique and/or specific outcomes and the ability to designate and engage sub-targets can provide the player with an ability to precisely target very specific areas to achieve these outcomes. For example, when an object includes a person, a sub-target could include the person's knee and allow a player to disable the person without killing the person. An advantage of these features is that it can reduce workload for the player during complex game play and/or allow precision play within the game that is unavailable without these features.

From the foregoing, it will be appreciated that specific embodiments of the invention have been described herein for purposes of illustration, but that various modifications may be made without deviating from the spirit and scope of the invention. For example, features described in the context of particular embodiments can be combined or eliminated in other embodiments. Accordingly, the invention is not limited except as by the appended claims.

We claim:

1. A computer-implemented method for targeting an object with a virtual gun in a gaming system used by a game player, comprising:
   receiving a soft lock command from the game player; and
   applying a soft lock with the virtual gun to at least a portion of an object, wherein applying the soft lock includes designating an action site on the at least a portion of the object that was proximate to an aiming reference of the virtual gun when the soft lock was commanded, the action site being at least proximate to where a game action will occur if the game action is commanded, wherein the aiming reference can be moved away from the at least a portion of the object after the soft lock is applied while the action site automatically remains on the at least a portion of the object without further action from the game player, wherein the game player may disengage the soft lock from the at least a portion of the object without the game action occurring, and wherein the action site is removed from the at least a portion of the object when the soft lock is disengaged.

2. The method of claim 1, further comprising:
   receiving a command to move a player's field of view so that the at least a portion of the object is no longer in the player's field of view; and
   moving the player's field of view so that the at least a portion of the object is no longer in the player's field of view, wherein the action site remains on the at least a portion of the object.

3. The method of claim 1, further comprising:
   receiving a command to move a player's field of view so that the at least a portion of the object is no longer in the player's field of view; and
   moving the player's field of view so that the at least a portion of the object is no longer in the player's field of view, wherein the action site remains on the at least a portion of the object;
   receiving a command to perform the at least one game action; and
   performing the at least one game action.

4. The method of claim 1, further comprising:
   receiving a command to apply a hard lock to the action site;
   applying a hard lock to the action site, the hard lock causing the aiming reference to remain at least proximate to the at least a portion of the object where the action site was when the hard lock was applied.

5. The method of claim 1, further comprising:
   receiving a command to apply a hard lock to the action site through an inceptor;
   applying a hard lock to the action site, the hard lock causing the aiming reference to remain at least proximate to the at least a portion of the object where the action site was when the hard lock was applied; and
   changing at least one attribute of the inceptor after the hard lock is applied.

6. The method of claim 1, further comprising:
   receiving a command to apply a hard lock to the action site;
   applying a hard lock to the action site, the hard lock causing the aiming reference to remain at least proximate to the at least a portion of the object where the action site was when the hard lock was applied; and
   displaying at least one selectable sub-target associated with the object while the hard lock is applied to the at least a portion of the object, the sub-target being a selected part of the object.

7. The method of claim 1, further comprising:
   receiving a command to apply a hard lock to the action site;
   applying a hard lock to the action site, the hard lock causing the aiming reference to remain at least proximate to the at least a portion of the object where the action site was when the hard lock was applied;
   receiving a command to disengage the hard lock;
   disengaging the hard lock; and
   re-applying the soft lock, wherein re-applying the soft lock includes designating an action site at least proximate to the at least a portion of, the object where the aiming reference was when the hard lock was disengaged.

8. The method of claim 1, further comprising displaying one or more selected game attributes associated with the object when the soft lock is applied.

9. The method of claim 1, further comprising:
   displaying a first set of one or more selected game attributes associated with the object when the soft lock is applied;
   receiving a command to apply a hard lock to the action site;
   applying a hard lock to the action site, the hard lock causing the aiming reference to remain at least proximate to the at least a portion of the object where the action site was when the hard lock was applied; and
   displaying a second set of one or more selected game attributes associated with the object when the hard lock is applied.

10. The method of claim 1, further comprising automatically disengaging the soft lock when selected game attributes are present.

11. A computer-implemented method for targeting an object with a virtual gun in a gaming system used by a game player, comprising:
    receiving a command to hard lock at least a portion of an object from the game player;
    applying the hard lock with the virtual gun to the at least a portion of the object, the hard lock causing an aiming reference of the virtual gun to automatically remain at least proximate to the at least a portion of the object without further action from the game player; and
    displaying at least one selectable sub-target associated with the object while the hard lock is applied to the at least a portion of the object, the sub-target being a selected part of the object.

12. The method of claim 11 wherein receiving a command to hard lock at least a portion of an object includes receiving a command to hard lock the portion of the object that is proximate to an aiming reference when the hard lock is commanded.

13. The method of claim 11, further comprising:
    receiving a command to perform at least one game action at least proximate to the aiming reference; and
    performing the at least one game action at least proximate to the aiming reference.

14. The method of claim 11, further comprising:
receiving a command to select the at least one sub-target as an action site, the action site being at least proximate to where a game action will occur if the game action is commanded; and
selecting the at least one sub-target as the action site.

15. The method of claim 11, further comprising:
receiving a command to select the at least one sub-target as an action site, the action site being at least proximate to where a game action will occur if the game action is commanded;
selecting the at least one sub-target as the action site;
receiving a command to perform the game action; and
performing the game action.

16. The method of claim 11, further comprising:
receiving a command to select a first sub-target as an action site, the action site being at least proximate to where a game action will occur if the game action is commanded;
selecting the first sub-target as the action site;
receiving a command to select a second sub-target as the action site; and
selecting the second sub-target as the action site.

17. The method of claim 11 further comprising limiting a field of view that a player can select while the hard lock is applied such that the at least a portion of the object remains in the player's field of view.

18. The method of claim 11, further comprising limiting at least one movement a player can make when controlling a character while the hard lock is applied.

19. The method of claim 11, further comprising:
moving the at least a portion of the object; and
moving a player's field of view so that the at least a portion of the object remains in the player's field of view as the at least a portion of the object moves.

20. The method of claim 11, further comprising displaying selected game attributes associated with the object when the hard lock is applied.

21. The method of claim 11, wherein receiving a command to hard lock the at least a portion of the object includes receiving a command via an inceptor, and wherein the method further comprises changing at least one attribute of the inceptor when the hard lock is applied.

22. The method of claim 11, further comprising:
receiving a command via an inceptor to select the at least one sub-target as an action site, the action site being at least proximate to where a game action will occur if the game action is commanded;
selecting the at least one sub-target as the action site; and
changing at least one attribute of the inceptor after the at least one sub-target is selected.

23. The method of claim 11, further comprising automatically disengaging the hard lock when selected game attributes are present.

24. The method of claim 11 wherein displaying at least one selectable sub-target associated with the at least a portion of the object includes displaying one of multiple sets of sub-targets associated with the at least a portion of the object, each set of sub-targets containing one or more sub-targets, the set of sub-targets that is displayed being dependent upon which of one or more selected game attributes exist at the time the hard lock is engaged.

25. The method of claim 11 wherein displaying at least one selectable sub-target associated with the at least a portion of the object includes displaying one of multiple sets of sub-targets associated with the at least a portion of the object, each set of sub-targets containing one or more sub-targets, a first set of sub-targets being displayed when one or more selected first game attributes exist at the time the hard lock is engaged, and wherein the method further comprises displaying a second set of sub-targets when one or more selected second game attributes exist.

26. A computer-readable medium having computer-executable instructions for performing steps comprising:
receiving a soft lock command from a game player that is controlling a virtual gun in a gaming environment; and
applying a soft lock using the virtual gun to at least a portion of an object, wherein applying the soft lock with the virtual gun includes designating an action site on the at least a portion of the object that was proximate to an aiming reference when the soft lock was commanded, the action site being at least proximate to where a game action will occur if the game action is commanded, wherein the aiming reference can be moved away from the at least a portion of the object after the soft lock is applied while the action site automatically remains on the at least a portion of the object without further action from the game player, wherein the game player may disengage the soft lock from the at least a portion of the object without the game action occurring, and wherein the action site is removed from the at least a portion of the object when the soft lock is disengaged.

27. The computer-readable medium of claim 26, wherein the steps further comprise:
receiving a command to move a player's field of view so that the at least a portion of the object is no longer in the player's field of view; and
moving the player's field of view so that the at least a portion of the object is no longer in the player's field of view, wherein the action site remains on the at least a portion of the object;
receiving a command for the at least one game action; and
performing the at least one game action.

28. The computer-readable medium of claim 26, wherein the steps further comprise:
receiving a command to apply a hard lock to the action site;
applying a hard lock to the action site, the hard lock causing the aiming reference marking to remain at least proximate to the at least a portion of the object where the action site was when the hard lock was applied; and
displaying at least one selectable sub-target associated with the object while the hard lock is applied to the at least a portion of the object, the sub-target being a selected part of the object.

29. The computer-readable medium of claim 26, wherein the steps further comprise:
receiving a command to apply a hard lock to the action site;
applying a hard lock to the action site, the hard lock causing the aiming reference to remain at least proximate to the at least a portion of the object where the action site was when the hard lock was applied;
receiving a command to disengage the hard lock;
disengaging the hard lock; and
re-applying the soft lock, wherein re-applying the soft lock includes designating an action site at least proximate to the at least a portion of the object where the aiming reference was when the hard lock was disengaged.

30. The computer-readable medium of claim 26, wherein the steps further comprise automatically disengaging the soft lock when selected game attributes are present.

31. A computer-readable medium having computer-executable instructions for performing steps comprising:
receiving a command to hard lock using a virtual gun at least a portion of an object from a game player using the virtual gun;

applying the hard lock with the virtual gun to the at least a portion of the object, the hard lock causing an aiming reference of the virtual gun to automatically remain at least proximate to the at least a portion of the object without further action from the game player; and displaying at least one selectable sub-target associated with the object while the hard lock is applied to the at least a portion of the object, the sub-target being a selected part of the object.

32. The computer-readable medium of claim 31 wherein receiving a command to hard lock at least a portion of an object includes receiving a command to hard lock the portion of the object that is proximate to an aiming reference when the hard lock is commanded.

33. The computer-readable medium of claim 31, wherein the steps further comprise:

receiving a command to perform at least one game action at least proximate to the aiming reference; and performing the at least one game action at least proximate to the aiming reference.

34. The computer-readable medium of claim 31, wherein the steps further comprise:

receiving a command to select the at least one sub-target as an action site, the action site being at least proximate to where a game action will occur if the game action is commanded; and selecting the at least one sub-target as the action site.

35. The computer-readable medium of claim 31, wherein the steps further comprise:

receiving a command to select the at least one sub-target as an action site, the action site being at least proximate to where a game action will occur if the game action is commanded;

selecting the at least one sub-target as the action site;

receiving a command to perform the game action; and performing the game action.

36. The computer-readable medium of claim 31, wherein the steps further comprise:

receiving a command to select a first sub-target as an action site, the action site being at least proximate to where a game action will occur if the game action is commanded;

selecting the first sub-target as the action site;

receiving a command to select a second sub-target as the action site; and selecting the second sub-target as the action site.

37. The computer-readable medium of claim 31, wherein the steps further comprise automatically disengaging the hard lock when selected game attributes are present.

38. The computer-readable medium of claim 31 wherein displaying at least one selectable sub-target associated with the at least a portion of the object includes displaying one of multiple sets of sub-targets associated with the at least a portion of the object, each set of sub-targets containing one or more sub-targets, the set of sub-targets that is displayed being dependent upon which of one or more selected game attributes exist at the time the hard lock is engaged.

39. The computer-readable medium of claim 31 wherein displaying at least one selectable sub-target associated with the at least a portion of the object includes displaying one of multiple sets of sub-targets associated with the at least a portion of the object, each set of sub-targets containing one or more sub-targets, a first set of sub-targets being displayed when one or more selected first game attributes exist at the time the hard lock is engaged, and wherein the method further comprises displaying a second set of sub-targets when one or more selected second game attributes exist.

* * * * *

UNITED STATES PATENT AND TRADEMARK OFFICE
CERTIFICATE OF CORRECTION

| | | |
|---|---|---|
| PATENT NO. | : 7,963,833 B2 | Page 1 of 1 |
| APPLICATION NO. | : 10/966824 | |
| DATED | : June 21, 2011 | |
| INVENTOR(S) | : Christopher M. Novak et al. | |

It is certified that error appears in the above-identified patent and that said Letters Patent is hereby corrected as shown below:

In Face page, in field (75), under "Inventors" column 1, line 3, delete "Billy Thompson," and insert -- Billy Thomson, --, therefor.

In column 14, line 22, in Claim 7, delete "of," and insert -- of --, therefor.

Signed and Sealed this

Thirtieth Day of August, 2011

David J. Kappos
*Director of the United States Patent and Trademark Office*